(Model.)
D. J. PRYOR.
HORSESHOE.
No. 304,853. Patented Sept. 9, 1884.
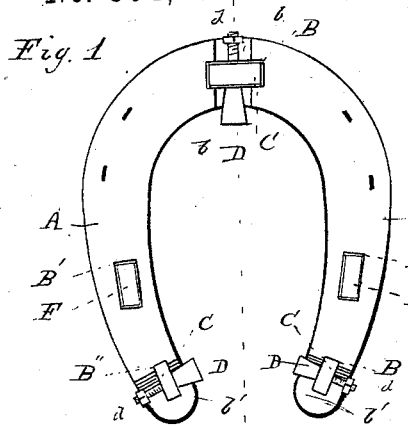
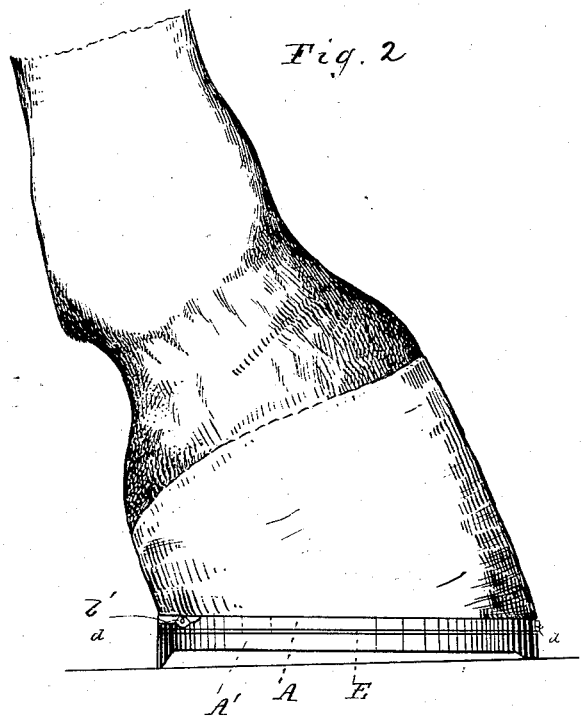
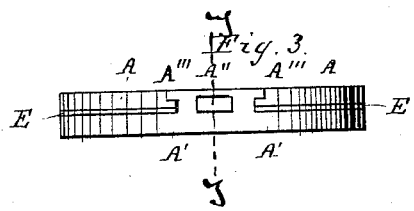
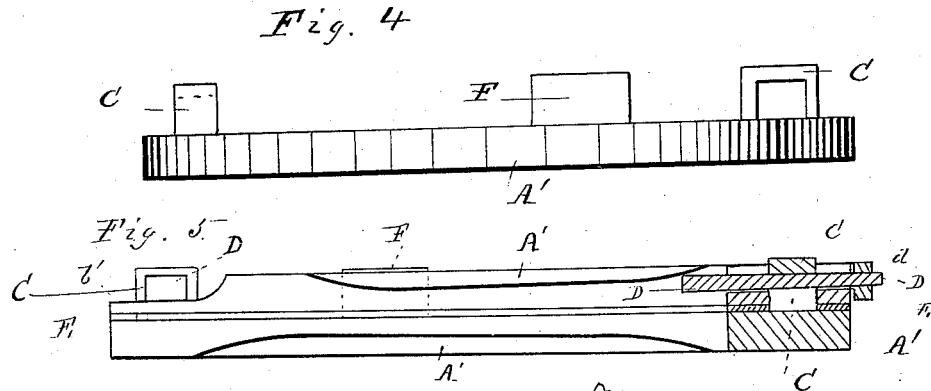
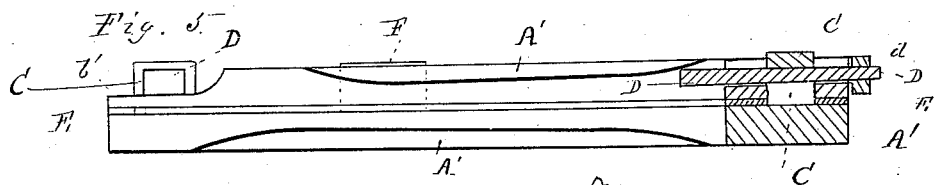
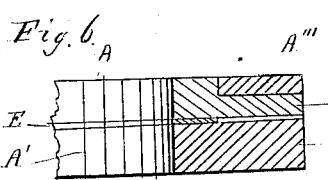
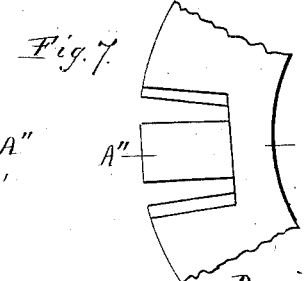
WITNESSES
Morton Toulmin
Edwin L. Bradford
INVENTOR
David J. Pryor
W. H. Wills & Co.
Attorney

UNITED STATES PATENT OFFICE.

DAVID J. PRYOR, OF ROXBURY, MASSACHUSETTS.

HORSESHOE.

SPECIFICATION forming part of Letters Patent No. 304,853, dated September 9, 1884.

Application filed April 14, 1884. (Model.)

*To all whom it may concern:*

Be it known that I, DAVID J. PRYOR, a citizen of the United States, residing at Roxbury, in the county of Suffolk and State of Massachusetts, have invented certain new and useful Improvements in Horseshoes, of which the following is a specification, reference being had therein to the accompanying drawings.

This invention relates to improvements in horseshoes, and has the following objects:

First. When a horse is subject to calk himself at night, this shoe can be easily removed without going to a blacksmith or tearing the hoof to pieces.

Second. By putting a small piece of rubber between the metal plates forming the shoe it makes it easier for the horse and prevents him from getting chest-foundered, as is frequently the case, from hammering the streets.

Third. Where a man loves his horse and works him hard, he can remove these shoes at night without much trouble, (as a horse needs this as much as a man needs his slippers.) It will be found frequently that a horse kicks the sides of his stall. This is because his feet ache and he wants ease.

Fourth. To provide horse-railroads, in the sharpening season, with a shoe which can be changed by an ordinary man with rapidity, without going to a blacksmith. An ordinary driver can do this work at the rate of sixty horses in a day.

These objects are attained by the devices illustrated in the accompanying drawings, forming a part of this specification, in which—

Figure 1 is a plan of the shoe. Fig. 2 is a side elevation. Fig. 3 shows a modification. Fig. 4 is an enlarged detail view of the lower plate, A'. Fig. 5 is a sectional view of the shoe on the line *x x* of Fig. 1. Fig. 6 is a sectional view of the toe of the shoe, as shown in the modification, Fig. 3, the remainder of the shoe being broken away. Fig. 7 is a detached plan view of a part of the plate A, in its modified form, and shows a portion cut away, so as to form a tongue or tenon, A''.

The letter A indicates the upper plate, which is attached to the hoof by nails in the usual manner. This plate is furnished with slots or openings B B' B'', and is reduced in thickness at *b b'*, in order that the wedges D may have a bearing below the upper surface of the plate A, and thereby prevent the wedges D from being in the way of the under part of the hoof, and thus prevent the plate A from being closely fastened thereto. The openings B' are intended to receive lugs F, forming part of the under portion or plate, A', of the shoe, and the slots B B'' are to receive the loops C, also attached to the lower plate.

D are wedge-shaped pieces of metal having pins extending from the small end, provided with screw-threads adapted to receive nuts *d*, by means of which the wedges D, when placed within the loops C, may be drawn forcibly in an outward direction, and thereby hold as well as draw the two plates A A' toward each other after the loops have been inserted in the slots B B''.

Some soft or elastic material—such as rubber or leather—is to be placed between the upper and lower plates forming the shoe, for the purpose of preventing the jar incident to having the two hard-metal surfaces of the plates A A' coming directly in contact with each other when the horse is on the road.

The plate A', forming the lower part of the shoe, may be provided with calks, or have its lower surface perfectly smooth.

The letter E indicates the rubber washer or other elastic material to be placed between the upper and lower plates.

The modified form shown in Fig. 3 represents another method of fastening the upper and lower plates to each other at the toe. This is accomplished by cutting out a part of the toe of the plate A in such a manner as to form a tenon, as shown in Fig. 7, and by forming on the upper part of the plate A' a loop, A''', (shown in Figs. 3 and 6,) to receive said tenon, the other means of fastening the two plates A A' together being the same already described with regard to Fig. 1.

Having described my invention, what I desire to secure by Letters Patent, and claim, is—

In a horseshoe, the upper plate, A, having slots B B' B'', and thinner portions *b b'*, and the elastic washer E, in combination with the lower plate, A', having lugs F and loops C, and wedge-shaped pieces D, provided with nuts *d*, as described, and for the purposes set forth.

In testimony whereof I affix my signature in presence of two witnesses.

DAVID J. PRYOR.

Witnesses:
FREDERICK D. ELY,
JOHN R. BULLARD.